United States Patent [19]

Schulte

[11] Patent Number: 4,508,060
[45] Date of Patent: Apr. 2, 1985

[54] SKID MOUNTED MULTIPLE WEANING CALF ENCLOSURE

[76] Inventor: Jan J. Schulte, Rte. 1, Dorchester, Iowa 52140

[21] Appl. No.: 570,240

[22] Filed: Jan. 12, 1984

[51] Int. Cl.³ .............................................. A01K 1/00
[52] U.S. Cl. ......................................... 119/16; 119/20
[58] Field of Search .............................. 119/16, 20, 27

[56] References Cited

U.S. PATENT DOCUMENTS

| | | | |
|---|---|---|---|
| 1,823,940 | 9/1931 | Hoegermeyer | 119/16 |
| 2,712,677 | 7/1955 | Hyde | 119/16 X |
| 2,732,826 | 1/1956 | Dawson | 119/20 |
| 3,256,858 | 6/1966 | Pals | 119/16 |
| 3,541,994 | 11/1970 | Meng | 119/20 |

FOREIGN PATENT DOCUMENTS 1568072  5/1980  United Kingdom .................. 119/16

*Primary Examiner*—Hugh R. Chamblee
*Attorney, Agent, or Firm*—Don E. Ferrell

[57] ABSTRACT

An elongated floor structure is provided having upstanding opposite end and rear walls supported therefrom. A pair of elongated ground skids are mounted beneath and extend along front and rear marginal portions of the floor structure and a roof structure extends between and interconnects the upper marginal portions of the rear and opposite end walls. A plurality of upstanding posts are spaced along the forward marginal portion of the floor structure between the end walls and support corresponding front marginal portions of the roof structure from the front marginal portion of the floor structure. A front-to-rear extending upstanding main partition extends between each of the posts and a corresponding portion of the rear wall and a horizontally swingable gate removably closes the forward end of each area disposed between adjacent main partition and each end wall and the adjacent partition. Further, two front-to-rear extending supplemental partitions divide each aforementioned area into three animal receiving stalls. The floor structure defines front-to-rear extending slots therein slightly more than one inch in width so as to allow substantial amounts of manure to fall through the slots and at least one set of corresponding ends of the ground skids include structure for anchoring one or more tow members thereto preparatory to skidding the enclosure a distance at least equal to the length of the enclosure. Each of the gates supports feed and water containers therefrom.

8 Claims, 4 Drawing Figures

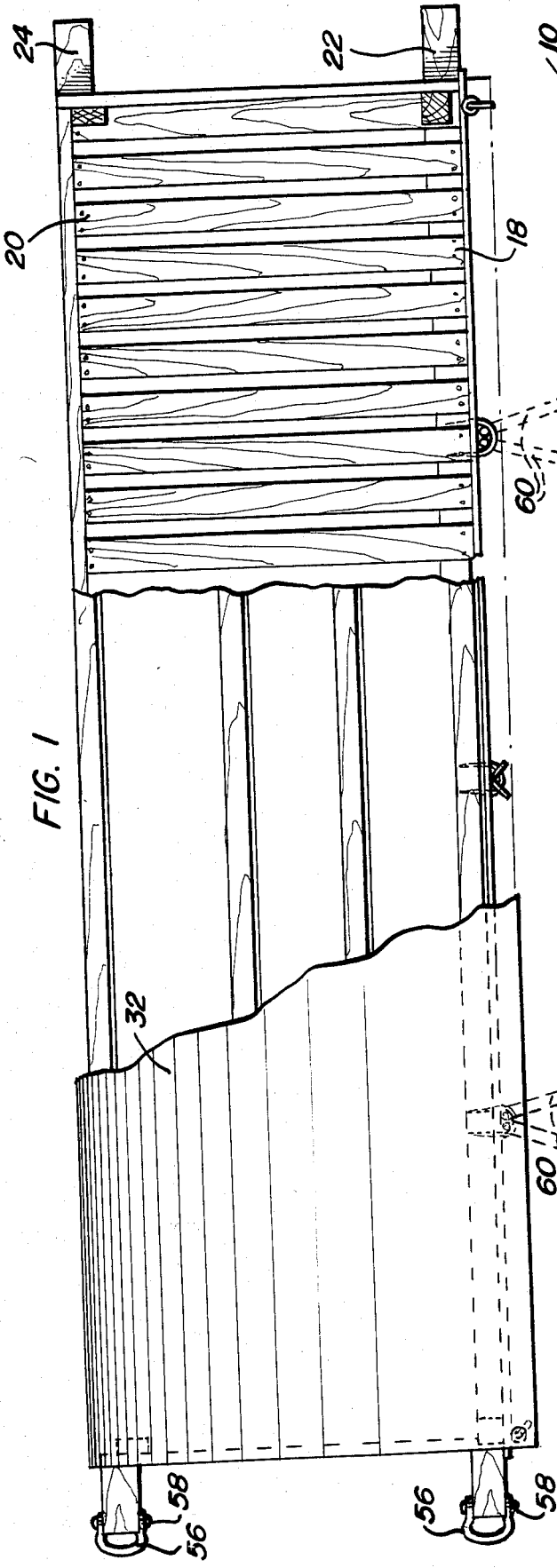
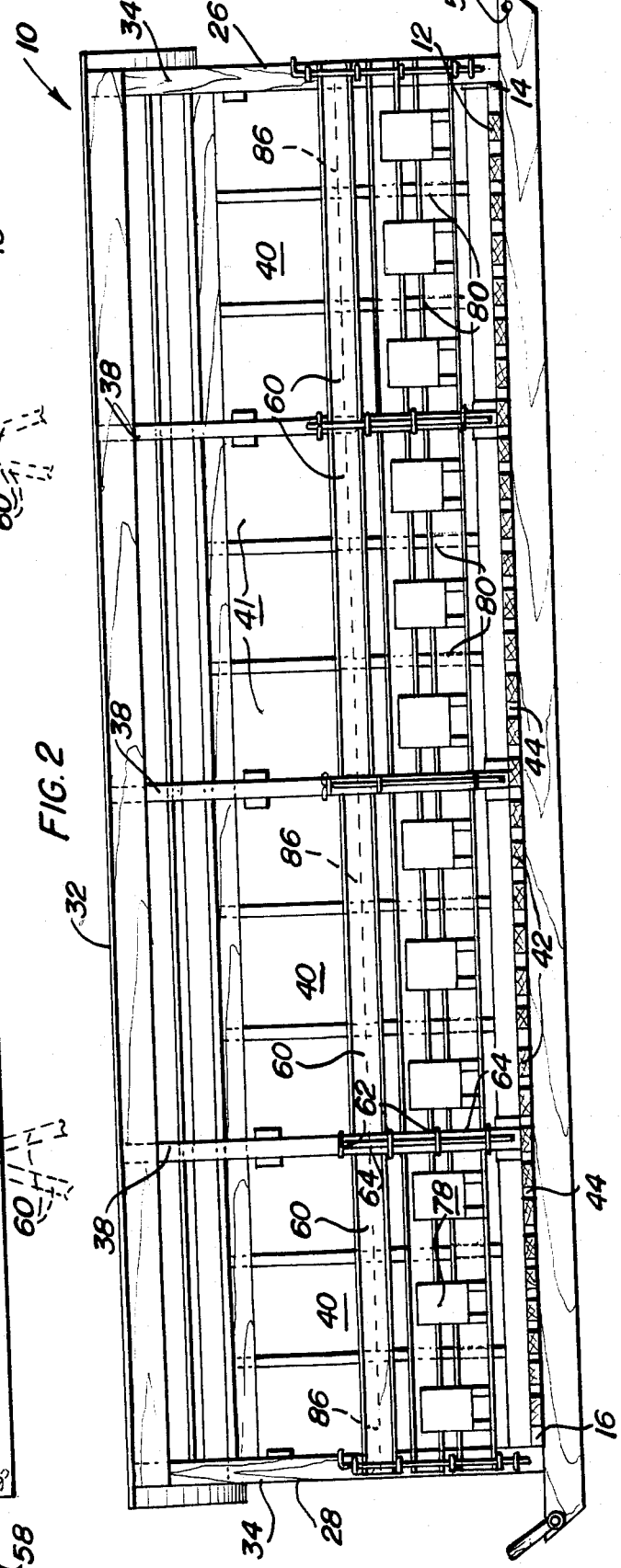

SKID MOUNTED MULTIPLE WEANING CALF ENCLOSURE

BACKGROUND OF THE INVENTION

When raising bovine an other animals the young animals are conventionally weaned by taking them from their parents and placing them in weaning pens or enclosures in which they are fed predetermined feed in controlled amounts. However, an animal being weaned should be contained in an area which is reasonably warm, dry and sanitary.

To this end most persons raising livestock attempt to provide enclosures for animals being weaned which afford shelter from the elements and may be cleaned when necessary. On the other hand, the cleaning of manure from a number of weaning enclosures can be highly time-consuming. Accordingly, a need exists for a weaning enclosure which will provide ample ventilation, protection from the elements and yet which will substantially reduce the amount of time which must be spent in removing manure from the enclosures.

Examples of various different forms of animal enclosures including some of the general structural and operational features of the instant invention are disclosed in U.S. Pat. Nos. 809,543, 2,712,677, 2,732,826, 2,863,419, 3,416,496, 3,541,994, 3,724, 424 and 3,853,555.

BRIEF DESCRIPTION OF THE INVENTION

The weaning calf enclosure of the instant invention has been specifically designed to provide an enclosure for weaning calves and which will protect the calves from the elements and provide ample ventilation. Further, the enclosure is mounted upon ground skids and includes a slotted floor incorporating front-to-rear extending slots of sufficient width to allow manure to fall through the slots and onto the ground beneath the floor. After manure has accumulated beneath the slots in the floor a tractor may be attached to the enclosure in order to skid the latter lengthwise over the ground a distance at least equal to the length of the enclosure thereby placing the enclosure over clean ground and exposing the collected manure on the ground beneath the original position of the enclosure. The collected manure may then be readily picked up by a front loader or other similar equipment. In this manner, the task of maintaining a weaning calf enclosure reasonably clean and collection and disposal of the manure which collects during a weaning process is greatly facilitated.

The main object of this invention is to provide a livestock weaning enclosure in which livestock to be weaned may be assured proper feeding and watering, protection from the elements in a well ventilated environment and maintained relatively clean of manure build-up.

Another object of this invention is to provide a livestock weaning enclosure which may be readily moved from one location to another.

Still another object of this invention is to provide a weaning enclosure constructed in a manner whereby the flooring of the enclosure may be maintained reasonably free of accumulated manure and manure accumulated during the weaning process may be relatively easily collected and transported to a remote point of use.

A final object of this invention to be specifically enumerated herein is to provide a livestock weaning enclosure in accordance with the preceding objects and which will conform to conventional forms of manufacture, be of simple construction and easy to maintain so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the enclosure of the instant invention with portions of the roof structure broken away and alternate open positions of the gates of the enclosure illustrated in phantom lines;

FIG. 2 is a front elevational view of the enclosure;

DETAILED DESCRIPTION OF THE INVENTION

Figure 3:
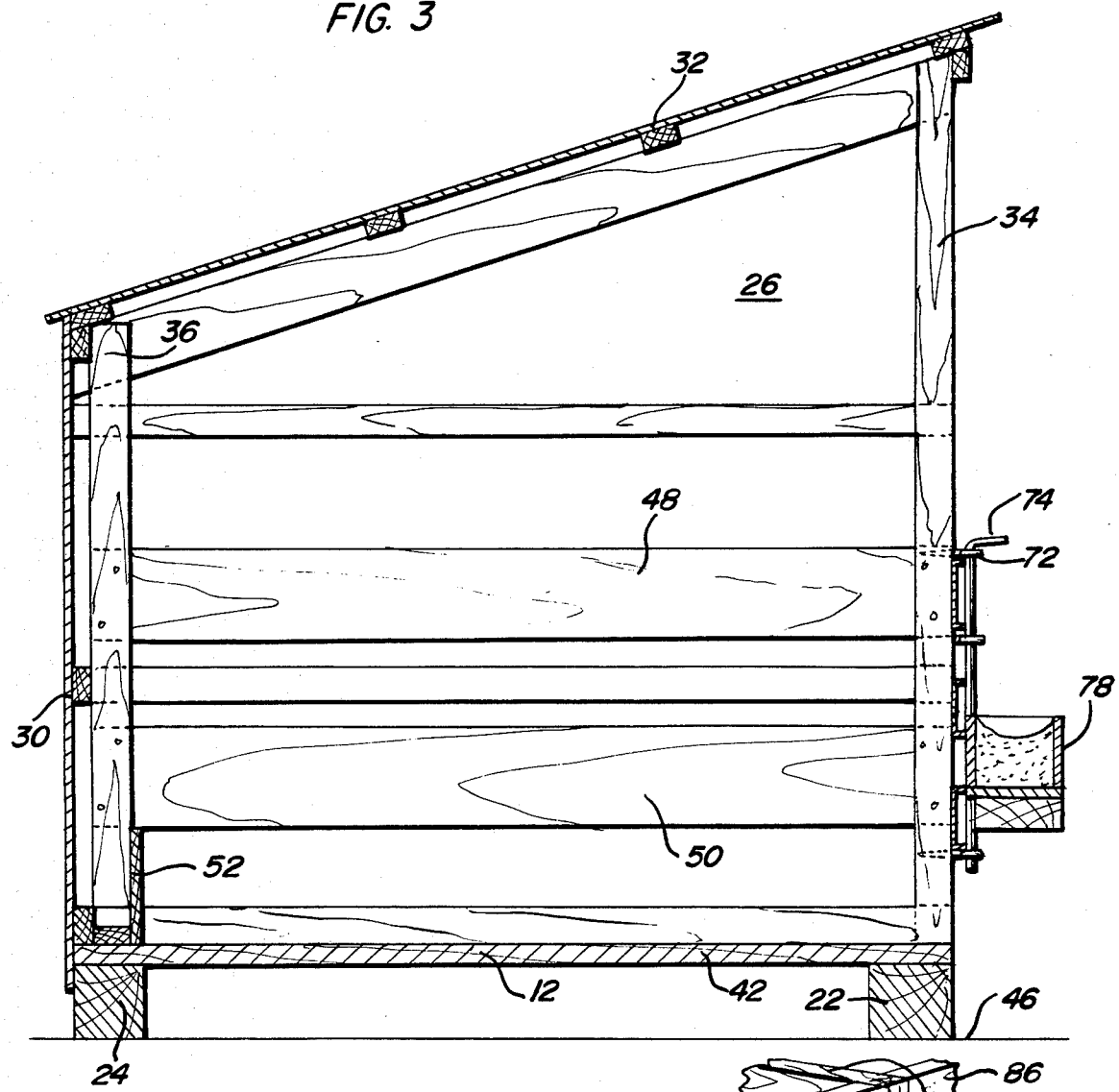
FIG. 3 is an enlarged fragmentary transverse vertical sectional view of the enclosure.
Figure 4:
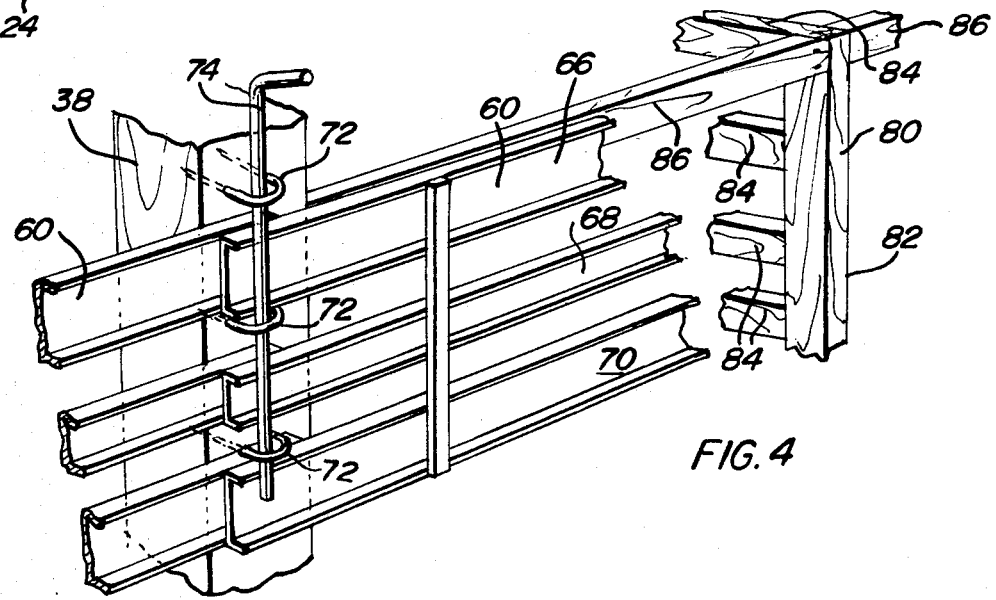
FIG. 4 is an enlarged fragmentary perspective view illustrating the manner in which adjacent free-swinging gate ends of the enclosure may be latched in the closed positions.

Referring now more specifically to the drawings the numeral 10 generally designates an animal weaning enclosure constructed in accordance with the present invention. The enclosure 10 includes an elongated floor structure 12 having opposite end marginal portions 14 and 16 and front and rear marginal portions 18 and 20. A pair of elongated ground skids 22 and 24 extend longitudinally along, underlie and are anchored relative to the front and rear marginal portions 18 and 20 of the floor structure 12. Opposite end walls 26 and 28 extend across and project upwardly from the end marginal portions 14 and 16 and a rear wall 30 extends along and projects upwardly from the rear marginal portion 20 and interconnects the rear ends of the end walls 26 and 28. In addition, a shed-type rearwardly and downwardly inclined roof structure 32 is supported from the upper marginal portions of the end walls 26 and 28 and the rear wall 30.

Each of the end walls 26 and 28 includes front and rear posts 34 and 36 and the posts 34 support the opposite ends of the forward marginal portion of the roof structure 32. Further, three additional upstanding posts 38 are spaced between the posts 34 and extend between the forward marginal portions of the floor and roof structures 12 and 32.

The spacing between adjacent posts 38 and the posts 34 and the adjacent posts 38 define animal receiving areas 40 each incorporating these stalls 41 in which a weaning animal may be received. The floor structure 12 consists primarily of front-to-rear extending laterally spaced floorboards 42 and the spacing between adjacent floorboards 42 is approximately 1⅛ inches thereby defining front-to-rear extending slots 44 between adjacent boards 42 through which manure may fall onto the ground 46 between the ground skids 22 and 24.

Partitions consisting of front-to-rear extending upper and lower boards 48 and 50 extend between the posts 38 and the rear wall 30 and separate adjacent areas 40 from each other and the rear of each area 40 includes a lower edge upstanding filler board 52 whose lower marginal edge is downwardly abutted against the floor structure 12.

The opposite ends of the ground skids 22 and 24 are provided with transverse bores 54 and a pair of shackles 56 are mounted from one pair of corresponding ends of the ground skids 22 and 24 by suitable removable pins 58. The shackles 56 may be used to skid the enclosure 10 lengthwise over the ground 46.

The posts 38 adjacent the posts 34 each have a pair of horizontally swingable gates 60 pivotally supported therefrom by large staples 62 driven into those posts and which rotatably receive upstanding end rods 64 of the gates 60. The rods 64 extend between and interconnect vertically spaced horizontal members 66, 68 and 70 of the gates 60 and each of the horizontal members 66, 68 and 70 rests upon one of the staples 64. The free swinging edge portions of the horizontal members 66, 68 and 70 are received between similar staples 72 driven into the center post 38 and each of the end posts 34. Vertically removable latching rods 74 are slidably received through the corresponding staples 72 for releasably latching the gates 60 in their closed positions.

From FIGS. 2 and 3 of the drawings it will be seen that each of the gates 60 may include three upwardly opening feed and water containers 78 whereby a weaning animal in each of the stalls 41 may obtain the desired amount of feed and water. Each of the areas 40 between, adjacent posts 34 and 38, includes a pair of front-to-rear extending partitions 80 including forward posts 82 and front-to-rear extending boards 84. The upper ends of adjacent posts 82 and 38 are interconnected by horizontal brace boards 86 disposed at a level approximately equal to the level of the upper edges of the gates 60. Further, it will be noted that various materials may be utilized in the construction of the enclosure 10, that the specific construction used in forming the roof structure 32 and the wall 26, 28 and 30 may vary as desired.

In operation, animals to be weaned may be placed within the stalls 41. The enclosure 10 will provide protection from the elements and define well aired stalls 41 for containing the animals. Further, the slots 44 between adjacent floorboards 42 enables substantially all of the manure falling upon the floor structure 12 to fall therethrough and collect on the ground 46 beneath the floor structure 12.

After an accumulation of manure has been built-up upon the ground 46 beneath the floor structure 12, a tractor or other suitable farm vehicle may be coupled to the shackles 56 in order to drag the enclosure 10 lengthwise over the ground 46 a distance at least equal to the length of the enclosure 10. This of course will place the floor structure 12 over a clean section of ground 46 and fully expose that section of ground 46 upon which manure had previously collected. Accordingly, the previously collected manure may be readily picked up from the ground.

By providing a weaning enclosure such as the enclosure 10 the animals being weaned each are provided a weather sheltered and well aired weaning stall which may be kept at least substantially clean from manure with a mininum of effort.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A skid mounted multiple weaning animal enclosure, said enclosure including an elongated floor structure having opposite end and front and rear marginal portions, a pair of elongated ground skids supported beneath and extending along said front and rear marginal portions and projecting outwardly beyond said end marginal portions, opposite end walls extending across and projecting upwardly from said end marginal portions and a rear wall extending along and projecting upwardly from said rear marginal portion and joining the rear ends of said end walls, a roof structure extending between and interconnecting the upper marginal portions of said rear and end walls, a plurality of upstanding posts spaced along said front marginal portion and between said end walls and supporting corresponding marginal portions of said roof structure from said front marginal portion, a front-to-rear extending upstanding partition extending between each of said posts and a corresponding portion of said rear wall, horizontally swingable gate means removably closing the forward end of each area disposed between adjacent partitions and each end wall and the adjacent partition each of said areas including a plurality of front-to-rear extending supplemental partitions dividing each area into a plurality of individual animal stalls, whereby each gate means removably closes the forward ends of a plurality of individual animal stalls, said floor structure defining front-to-rear extending slots therein of sufficient width to allow substantial amounts of manure to fall through said slots, at least one set of corresponding ends of said ground skids including means for anchoring one or more tow members thereto preparatory to skidding said enclosure lengthwise over the ground a distance at least equal to the length of said enclosure, and further wherein each of said gate means includes upstanding free-swinging and hinged edge portions, said hinged edge portions being defined by upstanding rod members, adjacent gate means being disposed with the rod members thereof in closely spaced side-by-side relation, each pair of closely spaced rod members being pivotally supported from a corresponding post by staples driven into the post and rotatably receiving the rod members therethrough.

2. The enclosure of claim 1 wherein said roof structure comprises a planar shed roof inclined rearwardly and downwardly.

3. The enclosure of claim 1 wherein each of said gate means includes feed and water trough structures supported therefrom.

4. The enclosure of claim 1 wherein said rear wall includes a lower edge upstanding filler board extending there along between each pair of adjacent posts and each end wall and the adjacent post.

5. The enclosure of claim 1 wherein each of said gate means extends upwardly from said floor structure approximately one half the distance between the forward marginal edge portion of said floor structure and the overlying portion of said roof structure.

6. The enclosure of claim 1 wherein said roof structure comprises a generally planar shed roof inclined rearwardly and downwardly.

7. The enclosure of claim 6 wherein each of said gate means includes feed and water trough structures supported therefrom.

8. The combination of claim 7 wherein said rear wall includes a lower edge upstanding filled board extending there along between each pair of adjacent posts and each end wall and the adjacent post.

* * * * *